US008683469B2

(12) United States Patent
Molaro et al.

(10) Patent No.: US 8,683,469 B2
(45) Date of Patent: Mar. 25, 2014

(54) ADAPTIVE COMMAND SCHEDULING

(75) Inventors: Donald Joseph Molaro, Cupertino, CA (US); Jorge Campello de Souza, Cupertino, CA (US); Richard M. H. New, San Jose, CA (US); Damien C. D. Le Moal, Sagamihara (JP)

(73) Assignee: HGET Netherlands B.V., Amsterdam (NL)

( * ) Notice: Subject to any disclaimer, the term of this patent is extended or adjusted under 35 U.S.C. 154(b) by 1319 days.

(21) Appl. No.: 11/848,174

(22) Filed: Aug. 30, 2007

(65) Prior Publication Data
US 2008/0168452 A1 Jul. 10, 2008

Related U.S. Application Data

(60) Provisional application No. 60/878,942, filed on Jan. 4, 2007, provisional application No. 60/878,903, filed on Jan. 5, 2007, provisional application No. 60/878,959, filed on Jan. 5, 2007.

(51) Int. Cl.
G06F 9/46 (2006.01)
(52) U.S. Cl.
USPC ............................ 718/102; 718/103; 718/104
(58) Field of Classification Search
None
See application file for complete search history.

(56) References Cited

U.S. PATENT DOCUMENTS

| 5,787,482 | A  | * | 7/1998  | Chen et al. ..................... 711/158 |
| 6,574,718 | B2 | * | 6/2003  | Sutherland et al. ........... 711/159 |
| 7,020,697 | B1 |   | 3/2006  | Goodman et al. |
| 7,383,470 | B2 | * | 6/2008  | Canning et al. ................. 714/38 |
| 7,602,783 | B2 | * | 10/2009 | Aimoto ......................... 370/392 |
| 7,640,412 | B2 |   | 12/2009 | Molaro et al. |
| 8,010,742 | B2 |   | 8/2011  | Molaro et al. |
| 2001/0024434 | A1 |   | 9/2001 | Ayyagari et al. |
| 2002/0007416 | A1 |   | 1/2002 | Putzolu |
| 2003/0115609 | A1 | * | 6/2003 | Frederickson et al. ......... 725/93 |
| 2004/0048613 | A1 |   | 3/2004 | Sayers et al. |
| 2006/0165088 | A1 | * | 7/2006 | Monta et al. ............... 370/395.4 |

FOREIGN PATENT DOCUMENTS

JP 11259311 * 11/1999

OTHER PUBLICATIONS

"Stochastic process," Wikipedia, the free encyclopedia, pp. 1-4, Dec. 13, 2006, //en.wikipedia.org/wiki/Stochastic_process.

* cited by examiner

Primary Examiner — Camquy Truong
(74) Attorney, Agent, or Firm — Steven J. Cahill

(57) ABSTRACT

A system for enhancing command scheduling is provided. In particular embodiments, the system includes a processor and a scheduler that receives commands from the processor for accessing a storage device. The scheduler receives a set of commands, some of which have a deadline, and the scheduler is configured to determine an execution order for those commands. The scheduler is also configured to defer the execution of one or more of those commands to a later time.

21 Claims, 5 Drawing Sheets

ADAPTIVE COMMAND SCHEDULING

CROSS-REFERENCES TO RELATED APPLICATIONS

This application claims the benefit of U.S. provisional patent application filed Jan. 4, 2007; U.S. provisional patent application 60/878,903, filed Jan. 5, 2007; and U.S. provisional patent application 60/878,959, filed Jan. 5, 2007, which are incorporated herein by reference.

BACKGROUND OF THE INVENTION

The present invention relates to scheduling systems, and more particularly, to techniques for enhancing command scheduling for data storage devices.

Systems such as digital video recorders (DVRs) and set-top boxes are evolving to support advanced features such as high-definition content, multi-stream capability, and mixed workloads. These features combine real-time traffic such as audio-video (AV) traffic and non-real-time traffic. For example, basic DVR functionality may include recording real-time AV streams to a hard disk drive, and later reading AV streams back to a user for viewing. In addition, a DVR may provide non-real-time functions and applications such as an electronic program guides, photo browsing, web browsing, music play list management, etc.

An input/output (IO) scheduler within the operating system layer is typically responsible for deciding when to issue real-time and non-real-time IO commands to the hard disk drive. Processing these real-time and non-real-time functions generates traffic to and from the hard disk drive. IO schedulers typically issue IO commands in the order received from a processor. System performance and quality of service requirements become more challenging as system requirements increase and IO command traffic increases. Delays in performing IO commands can be problematic in real-time applications, where unexpected command latency due to traffic congestion may compromise real-time performance. Therefore, it would be desirable to have an efficient scheduling system.

BRIEF SUMMARY OF THE INVENTION

The present invention provides techniques for enhancing command scheduling. According to some embodiments of the present invention, the system includes a processor and a scheduler that receives commands from the processor for accessing a storage device. The scheduler receives a set of commands, some of which have a deadline, and the scheduler is configured to determine an execution order for those commands. The scheduler is also configured to defer the execution of one or more of those commands to a later time.

According to additional embodiments of the present invention, the deferred time and time threshold are based at least in part on feedback associated with at least one actual command completion time.

Various objects, features, and advantages of the present invention will become apparent upon consideration of the following detailed description and the accompanying drawings.

DETAILED DESCRIPTION OF THE INVENTION

Particular embodiments of the present invention enhance the scheduling of commands. As described in more detail below, in one embodiment, the system includes a processor and an input/output (IO) scheduler. The IO scheduler is operable to receive IO commands from the processor, determine deadlines for each of the IO commands, and then issue the IO commands to a device, such as a data storage device, in an efficient manner. In particular embodiments, the IO scheduler may determine whether each deadline falls within a scheduling window. In particular embodiments, the scheduling window may be defined by a current time and threshold time. These parameters of the scheduling window are based at least in part on predicted command completion times. The IO scheduler defers issuing the IO commands that fall after the scheduling window to a later time in order to issue and complete urgent IO commands that have deadlines that fall within the scheduling window, and thus have earlier deadlines. As described in more detail below, the scheduling window is based on predicted command completion times that can adjust based on feedback associated with actual command completion times of individual IO commands or batches of IO commands. The process of deferring some IO commands ensures that the IO scheduler completes IO commands before their respective deadlines. As described in more detail below, the IO scheduler may group multiple IO commands in order to issue IO commands in batches. Issuing IO commands in batches increases idle times allowing the storage device to enter power saving states or to perform maintenance functions.

Although the present invention disclosed herein is described in the context of digital video recorders and hard disk drives, the present invention may apply to other types of systems such as set-top-boxes, digital surveillance systems, video editing systems, multi-media network storage devices, and other types of storage devices, and still remain within the spirit and scope of the present invention.

Figure 1:
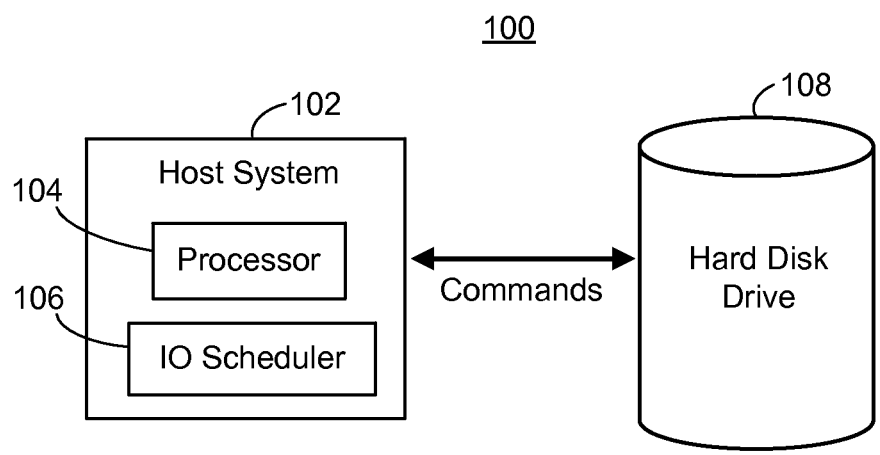
FIG. 1 is a block diagram that illustrates a host system and a hard disk drive, according to an embodiment of the present invention.

FIG. 1 is a block diagram that illustrates a system 100 and a hard disk drive 108, according to an embodiment of the present invention. The system 100 includes a host system 102 that includes a processor 104 and an input/output (IO) scheduler 106. The system 100 also includes a data storage device such as a hard disk drive 108. The host system 102 may be a DVR, set-top-box, or any other type of computer system, such as an embedded system, a minimalistic system, hand-held device or computer, etc. While the IO scheduler 106 is shown residing on the host system 102, the IO scheduler 106 may reside in any suitable location, separate from the host system 102 (e.g., on hard disk drive 108, etc.).

In operation, the host system 102 sends IO commands to the hard disk drive 108 via the IO scheduler 106. The IO scheduler 106 is operable to receive the IO commands from the processor, and determine deadlines for each of the IO commands. In some embodiments, the IO commands are for accessing the hard disk drive 108. For example, the IO commands include instructions for reading data from and writing data to the hard disk drive 108. As such, IO scheduler 106 is operable issue the IO commands to the hard disk drive 108. The hard disk drive 108 then performs the requested IO commands.

Figure 2:
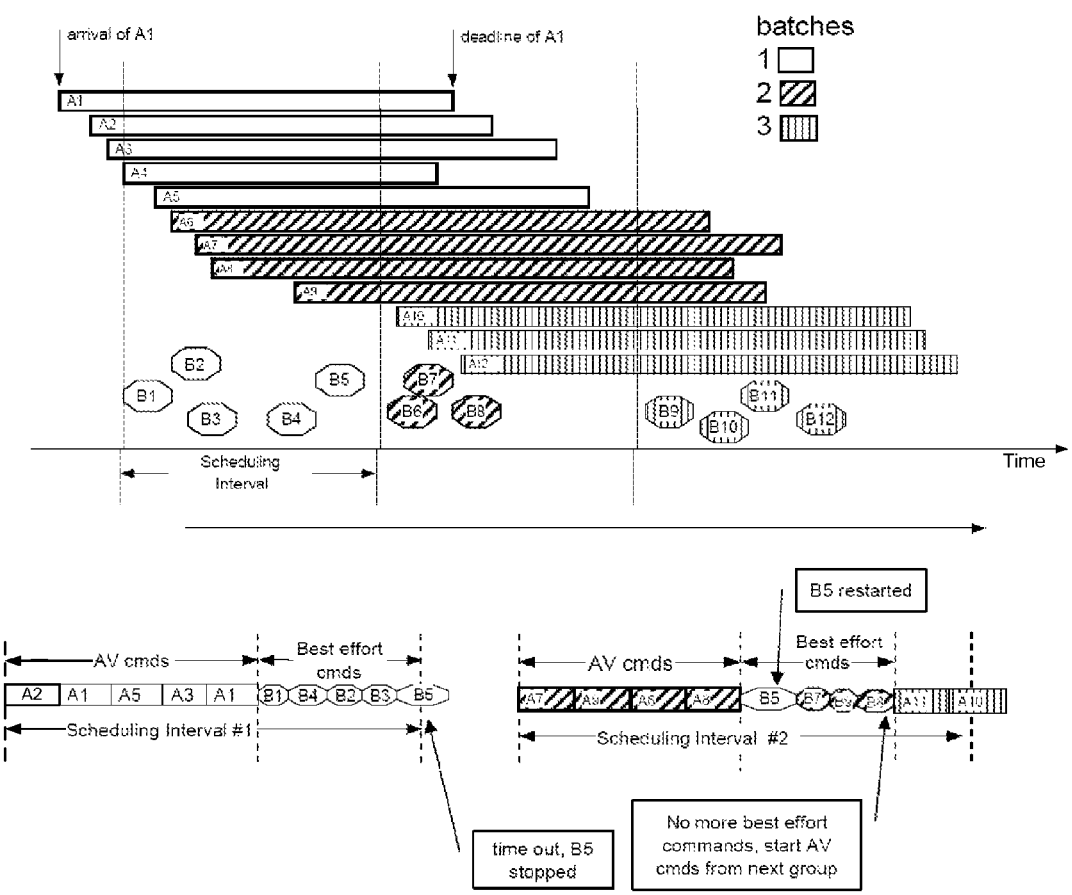
FIG. 2 is a diagram that illustrates a time line showing IO commands and corresponding deadlines, according to an embodiment of the present invention.

FIG. 2 is a diagram that illustrates a time line showing IO commands and corresponding deadlines, according to an embodiment of the present invention. FIG. 2 shows three batches of real-time AV commands (A1-A5, A6-A9, and A10-A12) and three batches of non-real-time best-effort commands (B1-B5, B6-B8, and B9-B12).

In one embodiment, the scheduler 106 algorithm may group the AV commands into batches, depending on their deadlines. For example, the scheduler 106 may group the AV commands with deadlines that fall within a particular scheduling window into a batch. The commands in this batch are issued to the hard disk drive 108 sometime in a previous scheduling window. In one embodiment, after the scheduler 106 issues a batch of AV commands, the scheduler 106 may issue as many best-effort commands as possible before the end of the scheduling window. In one embodiment, if there are no more best-effort commands to issue before the end of the scheduling window, the scheduler 106 may either begin issuing AV commands from the next batch, or may leave the hard disk drive 108 idle until the next scheduling window begins.

In one embodiment, the scheduler 106 may issue each batch of AV commands in the scheduling window that precedes the scheduling window containing the deadlines of those AV commands. Depending on how long it takes the AV commands to execute, issuing AV commands in the previous scheduling window may not be sufficient to guarantee that all of the AV commands complete before their deadlines. As described in more detail below, some embodiments of the present invention can determine when to begin issuing a given batch of AV commands in order to ensure that all of the AV commands within the batch meet their respective deadlines. The deadlines may vary from short (e.g., 100-200 milliseconds), to middle range (e.g., 500-600 milliseconds), to long (2 seconds). Embodiments disclosed herein make use of either deadlines or priorities on incoming IO commands.

In one embodiment, to improve the scheduling behavior, the IO scheduler 106 may utilize an adaptive hard disk drive model to estimate the amount of time required to complete one or more AV commands. The IO scheduler 106 may then use the adaptive hard disk drive model to determine the latest time at which the IO scheduler 106 should initiate a given batch of AV commands. For example, a batch of AV commands could be initiated when the time that the nearest deadline in the batch equals the estimated completion time for the batch plus some scheduling margin. In one embodiment, the scheduling margin refers to an extra safety margin that the IO scheduler 106 adds on to the command completion time or batch completion time estimate. The measured margin is the difference between the actual command completion time or batch completion time and the specified command deadline or batch deadline.

Figure 3:
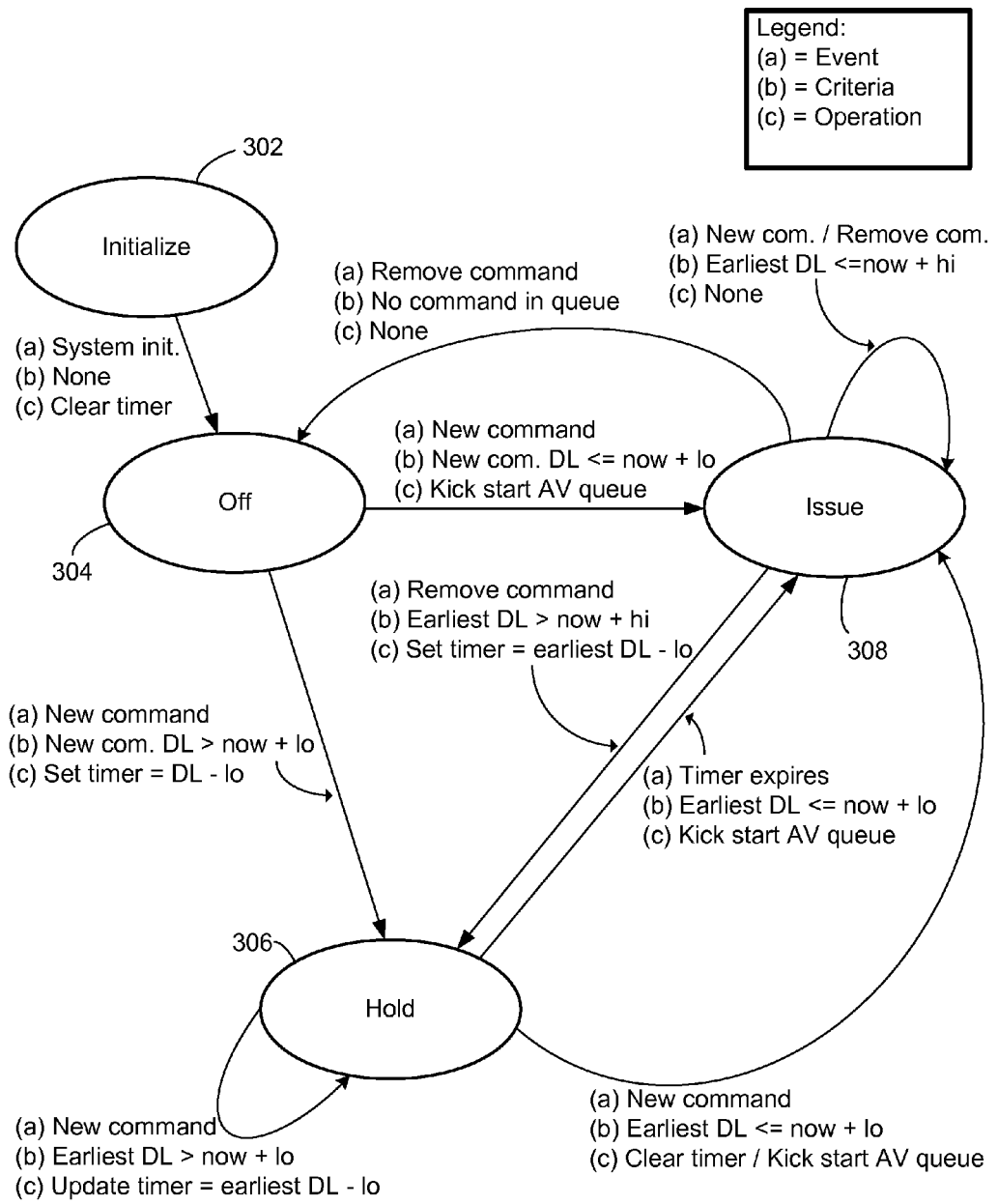
FIG. 3 is a state diagram that illustrates command processing states of the IO command scheduler, according to an embodiment of the present invention.

FIG. 3 is a state diagram that illustrates IO command processing states of the IO command scheduler 106, according to an embodiment of the present invention. FIG. 3 shows an initialize state 302, an off state 304, and a hold state 306, and an issue state 308. When the IO scheduler 106 first initializes 302, the IO scheduler 106 clears a timer and then transitions into the off state 304. When the IO scheduler 106 receives a new IO command, the IO scheduler implements a high-level algorithm to determine whether to transition to the hold state 306 or to the issue state 308.

In one embodiment, the high-level algorithm determines the deadline (DL) for each new IO command and compares the DL to at least one of two quantities, lo and hi. The quantities lo and hi are low and high thresholds, respectively, that define a scheduling window. In one embodiment, the quantity hi may be a fixed constant and may be fixed for all IO commands. In particular embodiments, the quantity hi is sufficiently long (e.g., 2 seconds) to allow IO commands to complete before their respective deadlines. In some embodiments, the quantity hi may adjust or adapt to the hard disk drive 108 command completion times. The quantity lo is adaptive in that it adjusts based on predicted or estimated IO command completion/service times. In one embodiment, the predicted IO command completion times may be based on historical actual completion times. The quantity lo may be reevaluated every time the IO scheduler 106 references it. In one embodiment, the quantity lo may be described according to the following equation:

$$lo = lo\_conf + coeff * estimated\_service\_time\_to\_finish\_all\_AV\_IO\ commands\_in\_this\_batch$$

The terms lo_conf and coeff are constant parameters configurable by the system designer. The term coeff is a percentage value in [0, 100] (e.g., 70%). The portion of the variable name "AV IO commands in this batch" refers to those AV IO commands that should be issued if the issue state 308 were the current state, as determined by the following criteria:

IO command deadline<=now+hi; or IO command logical block address (LBA) is sequential to any IO command that is in this scheduling batch. This may include IO commands that are included through several applications of the criteria.

In one embodiment, the state variables described herein may adapt over time to variations in the hard disk drive command completion times and to variations in measure margins (either for individual commands or groups of commands). Such variables that may adapt include threshold times (e.g., lo and hi), estimated/predicted completion times, scheduling margins, hard disk drive model variables, and stochastic hard disk drive model variables. Examples of these adaptations are described below.

In one embodiment, the estimated service time to complete all AV IO commands in the batch is determined by an adaptive hard disk drive model, where the estimated service time adapts to the actual hard disk drive command completion times. In one embodiment, the IO scheduler 106 may utilize a model of the hard disk drive 108 to estimate command completion times and then adapt to actual command completion times or to measured margins from either individual commands or from batches of commands. As such, a model that consistently overestimates or underestimates command completion times would change over time to provide improved estimates. For example, if the hard disk drive 108 is performing slowly, the quantity lo would increase so that IO commands have more time to complete. As such the quantity lo may approach the quantity hi. In some embodiments, an additional time (e.g., 300 ms) is added to the quantity lo as a buffer. Accordingly, if a batch of IO commands were taking longer to complete than expected (i.e., measured margin smaller than the scheduling margin), the IO scheduler 106 would increase the scheduling margin. Conversely, if a batch of commands were completing more quickly than estimated by the hard disk drive model (i.e., measured margin larger than the scheduling margin), the IO scheduler 106 would decrease the scheduling margin. Embodiments for adjusting estimated command completion times are described in more detail below.

When the workload of a hard disk drive becomes more demanding, the estimated time to complete all of the AV IO commands in a batch may increase and the quantity lo may increase as well. As such, the IO scheduler 106 is more likely to switch to the issue state 308.

In one embodiment, for each batch of commands, the IO scheduler 106 uses a single average command completion time value that may be assumed to be the same for all commands regardless of the size or the location on disk of the read or written data. To compute the estimated completion time for a batch of AV commands, multiply the average command completion time by the number of AV commands in the batch. While executing batches of commands, the IO scheduler 106 keeps track of the actual batch completion time, and compares it to the previous estimate of the batch completion time. If the hard disk drive 108 performs either better or worse than the estimate, the IO scheduler 106 adjusts the estimate accordingly based on the feedback.

In one embodiment, the estimated service time for a batch of AV commands may be computed according to the following equation:

Estimated batch completion time=

Average command completion time for one command*number of commands in the batch.

In one embodiment, after each batch as been completed, the average command completion time estimate used by the estimator may be adjusted according to the following equation:

Average command completion time for one command=

Average command completion time for one command+Feedback Gain*actual batch completion time−estimated batch completion time.

As such, if a batch of commands completes faster than the estimate (i.e., the hard disk drive 108 performs better than expected), the average command completion time estimate is decremented slightly so that the estimate may be improved in future estimates. Similarly, if the hard disk drive 108 performs poorly, the adaptive feedback loop may cause the estimated command completion time to increase. "Feedback Gain" is an adjustable parameter, but is, normally, set very low so that the adaptation is stable and takes a long time.

As described above, the IO scheduler 106 may utilize an adaptive hard disk drive model. In one embodiment, the IO scheduler 106 may also use a stochastic hard disk drive model to determine when to launch a new batch of commands. Specifically, the IO scheduler 106 may launch a batch of commands when the probability of some commands in the batch missing their deadlines (as computed by the stochastic model) equals a specific design target. In one embodiment, the IO scheduler 106 may determine a target probability for missing deadlines by utilizing a configurable quality of service target or specification, or through some other mechanism. As with other embodiments described herein, the stochastic model may adapt to variations in command completion times.

Embodiments of the adaptive hard disk drive model are able to effectively accommodate wide variations in performance and command completion times from one hard disk drive to another, particularly in an environment where hard disk drives from different manufacturers are used in the same DVR product. Some embodiments of the present invention address one well-known problem with hard disk drives, which is that they are often quite unpredictable in their behavior. For example, a given hard disk drive may occasionally initiate time consuming error recovery procedures (ERP) if a read or write operation is not successful after a few retries. Furthermore, variations in signal quality from disk to disk or head to head may give rise to marked differences in servomechanical (seek settling) performance. Even the performance of the same hard disk drive 108 may vary over time. Such variations may be substantial due to differences in raw mechanical performance, recording component integration and quality, prefetch and caching algorithms, degradation over time, and many other factors.

Referring again to FIG. 3, when the IO scheduler 106 receives a new IO command, the IO scheduler 106 determines the deadline (DL) of the new IO command and if the DL falls within or after the scheduling window. If the DL falls after the scheduling window (e.g., DL>now+lo), the IO scheduler 106 sets a timer (e.g., Timer=DL−lo) and transitions from the off state 304 to the hold state 306. The term "now" refers to the current time. As this equation shows, the IO scheduler 106 defers issuing the IO command. If the IO scheduler 106 receives a new IO command while in the hold state 306 and the DL of that new IO command falls after the scheduling window (e.g., DL>now+lo), the IO scheduler 106 resets the timer (e.g., Timer=earliest DL−lo) and remains in the hold state 306.

In one embodiment, the IO scheduler 106 may transition from the hold state 306 to the issue state 308 (and immediately issue all outstanding AV commands) if the IO scheduler 106 receives a new IO command with a short deadline, falling within the scheduling window (e.g., earliest DL<now+lo). As such, the IO scheduler 106 clears the timer and adds the IO command to the AV queue ("kick starts" the AV queue). The IO scheduler 106 may also transition from the hold state 306 to the issue state 308 when the timer expires. By the time the timer expires, the earliest deadline should fall within the scheduling window (e.g., earliest DL<now+lo). The IO scheduler 106 may also transition from the off state 304 to the issue state 308 if the IO scheduler 106 receives a new IO command that has a DL that falls within the scheduling window (e.g., DL<now+lo).

In one embodiment, while the IO scheduler 106 is in the issue state 308, the IO scheduler 106 continues to issue commands until there are no more AV IO commands in the queue or until all of the AV IO commands in the queue no longer have imminent deadlines (e.g., earliest DL>now+hi). The IO scheduler can then transition to off state 304 or hold state 306. In one embodiment, the IO scheduler 106 executes a lower-level algorithm while issuing commands. The lower-level algorithm is described in more detail below in connection with FIGS. 4 and 5.

Figure 4:
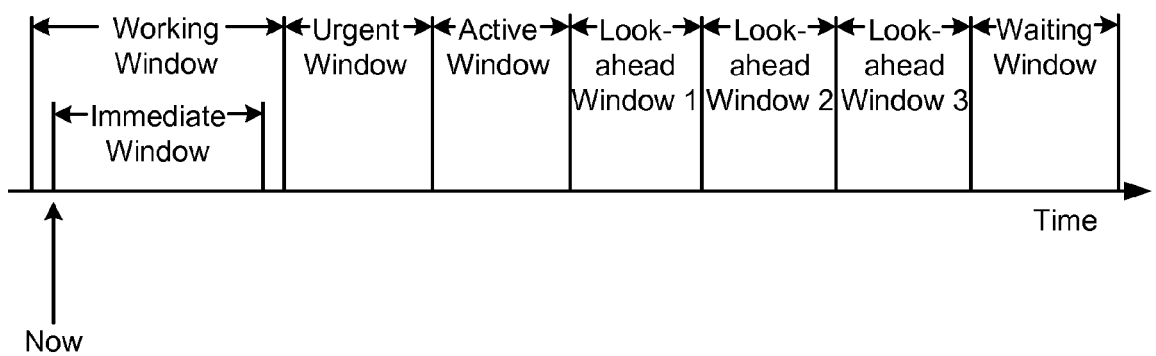
FIG. 4 is a block diagram that illustrates multiple scheduling windows that may be applied during the issue state of FIG. 3, according to an embodiment of the present invention.

FIG. 4 is a block diagram that illustrates multiple scheduling windows that may be applied during the issue state of FIG. 3, according to an embodiment of the present invention. In one embodiment, during the issue state 308, the IO scheduler 106 executes a low-level algorithm to determine the order of issuance of AV commands. The algorithm generates several scheduling windows to group streaming IO commands based on their deadlines. The immediate window is a sliding window in that it moves while time advances. All other windows advance in increments that are the length of the working window.

FIG. 4 shows multiple example windows that the low-level algorithm may utilize to order the IO commands. More specifically, FIG. 4 shows an immediate window, working window, urgent window, active window, and one or more look-ahead windows having various window widths. In one embodiment, the look-ahead windows include predefined thresholds. In the case that a working window has an associated threshold the IO commands in the working window are not considered, for the purposes of scheduling, until the working window has collected a sufficient number of commands to exceed the threshold.

In one embodiment, each one of the look ahead windows has an associated time threshold, and there are a minimum number of IO commands that have to be in those windows before the system will consider executing those IO commands. For example, under normal low load circumstances, the system may delay executing small numbers of IO commands as soon as they show up in the system. If the system is busy and there are many IO commands, the system may execute the IO commands as they arrive. By having many windows, with different time intervals and threshold numbers, the system may gracefully switch from the state of delaying IO commands to doing them as soon as they appear. In one embodiment, each successive window may capture one or more IO commands based on their deadlines. As such, the IO scheduler 106 may issue IO commands in an order that is based at least in part on their deadlines.

In one embodiment, within a given window, the IO scheduler 106 may execute streaming IO commands in logical block array (LBA) order, where the adjustable scheduling margin lo_conf may be adjustable. The multiple look-ahead windows may be used to accommodate bursty IO command patterns.

In one embodiment, the IO scheduler 106 may immediately consider best-effort IO commands for issuance, regardless of the state of the IO scheduler 106. When the IO scheduler 106 is in the off state 304 or in the hold state 306, the IO scheduler 106 may send best-effort IO commands to the hard disk drive 108 in cylinder scan (CSCAN) order. In one embodiment, when the IO scheduler 106 is in the issue state 308, the IO scheduler 106 may issue best-effort IO commands when there are no streaming IO commands left for the current schedule window or when there are three or fewer streaming commands waiting in the queue. The specific number of streaming commands is a configurable parameter, and the number may depend on the specific implementation.

As described in more detail below in connection with FIG. 5, the IO scheduler 106 may reorder the commands within the batch of a given window before issuing the IO commands to the hard disk drive 108. In one embodiment, batches of commands are issued at regular intervals, and as many best-effort commands as possible are issued between the batches of AV commands. This has the desirable effect of throttling best-effort traffic in favor of AV traffic, because best-effort commands are only issued when there is idle time between AV command batches. Frequently during normal operation of a DVR, there may be extended periods of pure AV traffic, in which case the hard disk drive 108 may be idle between batches of AV commands.

In some scheduling algorithm embodiments, incoming real-time commands can be deferred until close to their deadlines, so that they can be batched up with other incoming commands. Grouping commands into batches is beneficial, because IO commands can be issued more efficiently. Also, the scheduling algorithm has greater flexibility in re-ordering commands to minimize seeks within the hard disk drive 108. More efficient execution of the AV commands leaves more time for processing best-effort traffic, or alternately increases hard disk drive 108 idle time (and hence improves hard disk drive 108 reliability) if there is no outstanding best-effort traffic to be executed.

Figure 5:
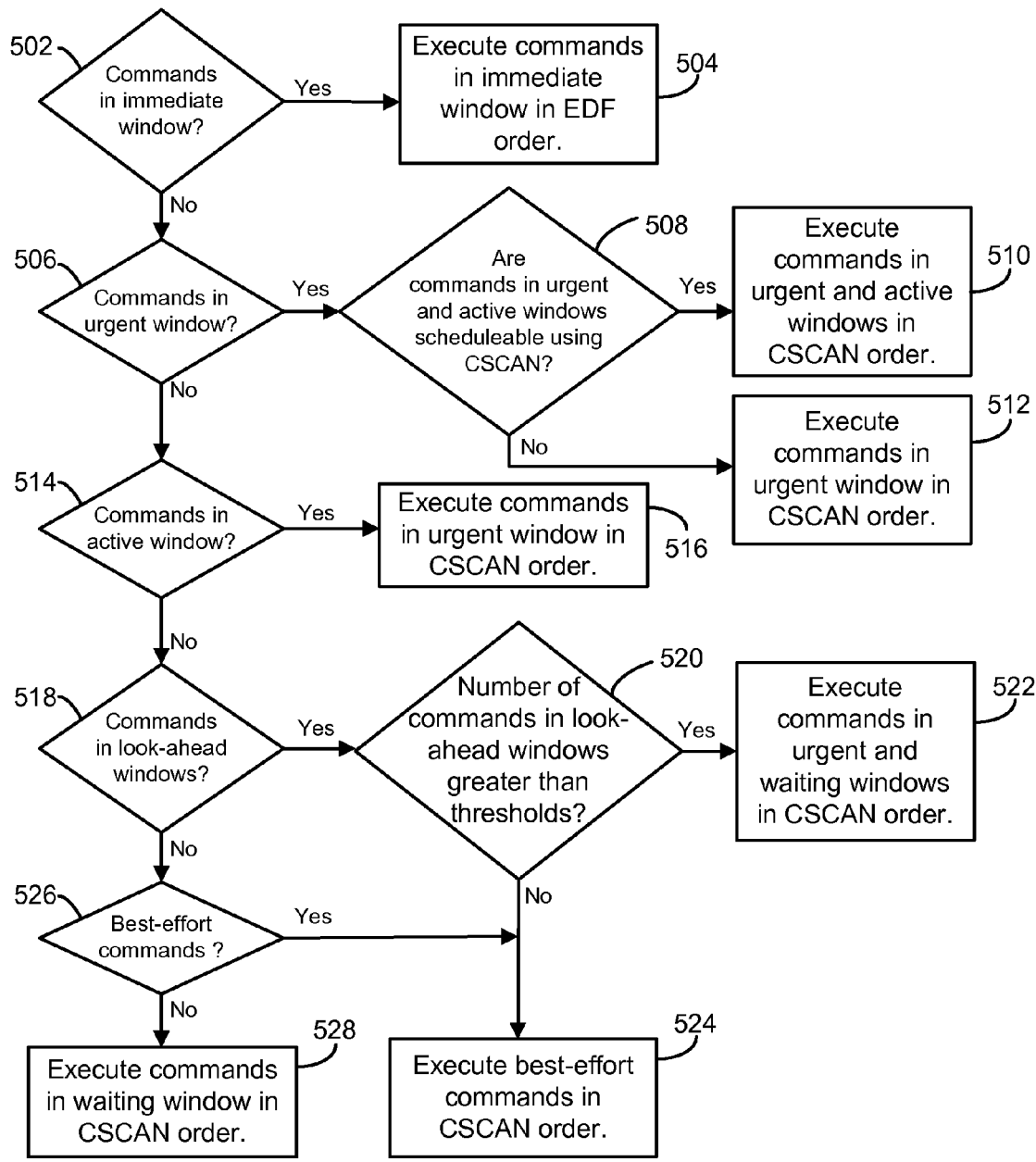
FIG. 5 is a flow chart that illustrates a process for ordering IO commands during the issue state of FIG. 3, according to an embodiment of the present invention.

FIG. 5 is a flow chart that illustrates a process for ordering IO commands during the issue state 308 of FIG. 3, according to an embodiment of the present invention. As FIG. 5 shows, the process begins at step 502 where the IO scheduler 106 determines if there are IO commands in the immediate window. If yes, at step 504, the IO scheduler 106 executes the IO commands in the immediate window in earliest-deadline-first (EDF) order. At step 506, the IO scheduler 106 then determines if there are IO command in the urgent window. If yes, at step 508, the IO scheduler 106 determines if there are IO commands in the urgent window or in the active window that are schedulable using CSCAN order. CSCAN order means ordering by increasing cylinder position on the hard disk drive. A set of IO commands that are schedulable using CSCAN within a particular time interval means that the algorithm has determined that the IO commands with deadlines that fall in the time interval would complete by the end of the time interval. If there are IO commands in the urgent or active windows that are schedulable using CSCAN order, at step 510, the IO scheduler 106 executes the IO commands in the urgent and active windows in CSCAN order. If there are no IO commands in the urgent or active windows that are schedulable using CSCAN order, at step 512, the IO scheduler 106 executes only the IO commands in the urgent window in CSCAN order. In one embodiment, the algorithm determines if it can execute the IO commands in the urgent and active windows in the available time. If it determines that it cannot execute those IO commands so that the deadlines of all of those IO commands are met, the algorithm executes the IO commands in only the urgent window in CSCAN order At step 514, the IO scheduler 106 then determines if there are IO commands in the active window. If yes, at step 516, the IO scheduler 106 executes the IO commands in the active window in CSCAN order. At step 518, the IO scheduler 106 then determines if there are IO commands in the look-ahead windows. If yes, at step 520 the IO scheduler 106 determines if the number of IO commands is greater than look-ahead window thresholds. If yes, at step 522, the IO scheduler 106 executes the IO commands in the urgent window and in the waiting window in CSCAN order. If not, at step 524, the IO scheduler 106 executes the best-effort IO commands in CSCAN order. At step 526, the IO scheduler 106 then determines if there are any best-effort IO commands to execute. If yes, at step 524, the IO scheduler 106 executes the best-effort IO commands in CSCAN order. If not, at step 528, the IO scheduler 106 executes the IO commands in the waiting window in CSCAN order.

Embodiments of the low-level algorithm ensure a specific quality of service target. In one embodiment, the low-level algorithm may affect best-effort traffic throughput and latency. For example, a hard disk drive with significant numbers of ERP events may require a larger scheduling margin. As such, some best-effort traffic may be throttled by the IO scheduler 106 in order to achieve that. Conversely, a high performing hard disk drive may have a lower scheduling margin. As such, the IO scheduler 106 may accommodate more best-effort traffic or may provide improved best-effort traffic latencies.

In the absence of any best-effort traffic, hard disk drive idle time may either be decreased or increased. By selectively deferring some IO commands, thereby increasing the hard disk drive idle times, the high-level and low-level algorithms described above minimize duty cycles subject to quality of service constraints. In particular embodiments, the duty cycle may represent the percentage of time that the hard disk drive is busy. As such, minimizing the duty cycle increases disk drive reliability, because the hard disk drive works less (e.g., less time seeking) and keeps its operating temperature to a minimum.

The foregoing description of the exemplary embodiments of the present invention has been presented for the purposes of illustration and description and is not intended to be exhaustive or to limit the scope of the present invention to the examples disclosed. A latitude of modification, various changes, and substitutions are intended in the present invention. In some instances, features of the present invention can be employed without a corresponding use of other features as set forth.

The invention claimed is:

1. A system comprising:
a processor; and
a scheduler that receives commands from the processor for accessing a storage device, wherein the scheduler is configured to:
determine a deadline for each of the commands; and
issue at least one of the commands to the storage device at a deferred time if the deadline for the at least one of the commands falls after a time threshold,
wherein the scheduler executes a first set of the commands in a first order if the scheduler determines that the first set of the commands have deadlines in a first scheduling time window, and wherein the scheduler executes a second set of the commands in a second order that is different than the first order if the scheduler determines that the second set of the commands have deadlines in a second scheduling time window,
wherein the scheduler is configured to execute the first set of the commands having deadlines in the first scheduling time window in earliest deadline first order, and wherein the scheduler is configured to execute the second set of the commands having deadlines in the second scheduling time window in cylinder scan order.

2. The system defined in claim 1 wherein the deferred time is based at least in part on feedback associated with at least one actual command completion time.

3. The system defined in claim 1 wherein the deferred time adapts over time to variations in actual command completion times.

4. The system defined in claim 1 wherein the time threshold is based at least in part on feedback associated with at least one actual command completion time.

5. The system defined in claim 1 wherein the time threshold adapts over time to variations in actual command completion times.

6. The system defined in claim 1 wherein the time threshold adapts over time based on command completion times of a stochastic hard disk drive model.

7. The system defined in claim 1 wherein the scheduler is configured to execute a third set of the commands having deadlines in a third scheduling time window in cylinder scan order.

8. The system defined in claim 1 wherein the commands are associated with reading and writing data from the storage device, and wherein the scheduler groups the first set of the commands into a batch, defers the first set of the commands until closer to the deadlines of the first set of the commands, and executes the first set of the commands in the batch.

9. A computer system that comprises code for a command scheduler, wherein the code is stored on a non-transitory computer readable medium, the computer system comprising:

code for determining a deadline for each command of a plurality of commands for accessing a storage device; and
code for issuing at least one of the commands to the storage device at a deferred time if the deadline for the at least one of the commands falls after a time threshold, wherein the command scheduler executes a first set of the commands in a first order if the command scheduler determines that the first set of the commands have deadlines in a first scheduling time window, and wherein the command scheduler executes a second set of the commands in a second order that is different than the first order if the command scheduler determines that the second set of the commands have deadlines in a second scheduling time window, and
wherein the command scheduler executes the first set of the commands having deadlines in the first scheduling time window in earliest deadline first order and the second set of the commands having deadlines in the second scheduling time window in cylinder scan order.

10. The computer system defined in claim 9 wherein the deferred time is based at least in part on feedback associated with at least one actual command completion time.

11. The computer system defined in claim 9 wherein the deferred time adapts over time to variations in actual command completion times.

12. The computer system defined in claim 9 wherein the time threshold is based at least in part on feedback associated with at least one actual command completion time.

13. The computer system defined in claim 9 wherein the time threshold adapts over time to variations in actual command completion times.

14. The computer system defined in claim 9 wherein the time threshold adapts over time based on command completion times of a stochastic hard disk drive model.

15. The computer system defined in claim 9 wherein the first scheduling time window is a sliding window that moves while time advances.

16. A method for a command scheduler, the method comprising:
determining a deadline for each command of a plurality of commands for accessing a storage device; and
issuing at least one of the commands to the storage device at a deferred time if the deadline for the at least one of the commands falls after a time threshold, wherein the command scheduler executes a first set of the commands in a first order if the command scheduler determines that the first set of the commands have deadlines in a first scheduling time window, and wherein the command scheduler executes a second set of the commands in a second order that is different than the first order if the command scheduler determines that the second set of the commands have deadlines in a second scheduling time window, and
wherein the command scheduler executes the first set of the commands having deadlines in the first scheduling time window in earliest deadline first order and the second set of the commands having deadlines in the second scheduling time window in cylinder scan order.

17. The method defined in claim 16 wherein the deferred time is based at least in part on feedback associated with at least one actual command completion time.

18. The method defined in claim 16 wherein the deferred time adapts over time to variations in actual command completion times.

19. The method defined in claim 16 wherein the time threshold is based at least in part on feedback associated with at least one actual command completion time.

20. The method defined in claim 16 wherein the time threshold adapts over time to variations in actual command completion times.

21. The method defined in claim 16 wherein the command scheduler executes non-real-time best-effort commands in cylinder scan order.

* * * * *